United States Patent
Wei et al.

(10) Patent No.: US 11,204,283 B2
(45) Date of Patent: *Dec. 21, 2021

(54) CAVITY BLACKBODY RADIATION SOURCE AND METHOD OF MAKING THE SAME

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 478 days.

This patent is subject to a terminal disclaimer.

(21) Appl. No.: 16/198,590

(22) Filed: Nov. 21, 2018

(65) Prior Publication Data

US 2019/0212202 A1   Jul. 11, 2019

(30) Foreign Application Priority Data

Jan. 11, 2018   (CN) .......................... 201810027421.1

(51) Int. Cl.
*G01K 15/00*   (2006.01)
*G01J 5/52*   (2006.01)
(Continued)

(52) U.S. Cl.
CPC ............... *G01J 5/522* (2013.01); *G01J 5/007* (2013.01); *G01J 5/061* (2013.01); *G01J 5/0887* (2013.01);
(Continued)

(58) Field of Classification Search
CPC combination set(s) only.
See application file for complete search history.

(56) References Cited

U.S. PATENT DOCUMENTS 8,110,883 B2 *   2/2012   Ward ...................... G01J 5/02
                                                     257/428
8,436,305 B1 *   5/2013   Sood ...................... G01J 5/20
                                                     250/338.1
(Continued)

FOREIGN PATENT DOCUMENTS

CN        2622629       6/2004
CN       101400198      4/2009
(Continued)

OTHER PUBLICATIONS

EPO Translation of JP2015203589 (Year: 2015).*
(Continued)

*Primary Examiner* — Lisa M Caputo
*Assistant Examiner* — Nasir U. Ahmed
(74) *Attorney, Agent, or Firm* — ScienBiziP, P.C.

(57) ABSTRACT

A cavity blackbody radiation source is provide. A cavity blackbody radiation source comprises a blackbody radiation cavity and a carbon nanotube layer. The blackbody radiation cavity comprises an inner surface. The carbon nanotube layer is located on the inner surface. The carbon nanotube carbon nanotube layer comprises a plurality of carbon nanotubes and a plurality of microporous. A method of making the cavity blackbody radiation source is also provide.

16 Claims, 8 Drawing Sheets

(51) Int. Cl.
*G01J 5/08* (2006.01)
*G01J 5/00* (2006.01)
*G01J 5/06* (2006.01)

(52) U.S. Cl.
CPC ............ *G01J 2005/0048* (2013.01); *G01J 2005/0074* (2013.01)

(56) References Cited

U.S. PATENT DOCUMENTS

| | | | |
|---|---|---|---|
| 8,741,422 | B2 | 6/2014 | Miao |
| 2008/0128603 | A1* | 6/2008 | Krellner ............... G01J 5/522 250/252.1 |
| 2008/0192797 | A1 | 8/2008 | Ko et al. |
| 2008/0248235 | A1* | 10/2008 | Feng ..................... B82Y 30/00 428/113 |
| 2008/0317088 | A1* | 12/2008 | Yamada ............... G01K 15/002 374/2 |
| 2009/0085461 | A1 | 4/2009 | Feng et al. |
| 2009/0096348 | A1 | 4/2009 | Liu et al. |
| 2009/0321420 | A1* | 12/2009 | Feng ..................... H05B 3/145 219/546 |
| 2011/0108545 | A1* | 5/2011 | Wang ..................... H05B 3/286 219/546 |
| 2011/0217451 | A1 | 9/2011 | Veerasamy |
| 2011/0315882 | A1 | 12/2011 | Hu et al. |
| 2012/0104213 | A1 | 5/2012 | Feng et al. |
| 2012/0312773 | A1 | 12/2012 | Cheng et al. |
| 2013/0295320 | A1 | 11/2013 | Liu et al. |
| 2015/0367557 | A1 | 12/2015 | Wei et al. |

FOREIGN PATENT DOCUMENTS

| | | |
|---|---|---|
| CN | 101409961 | 4/2009 |
| CN | 102452647 | 5/2012 |
| CN | 103382023 | 11/2013 |
| CN | 103602132 | 2/2014 |
| CN | 105197875 | 12/2015 |
| CN | 105562307 | 5/2016 |
| CN | 105675143 | 6/2016 |
| CN | 107014494 | 8/2017 |
| JP | 2015-203589 | 11/2015 |
| JP | 2017-3565 | 1/2017 |
| JP | 2017-024942 | 2/2017 |
| TW | 200834046 | 8/2008 |
| TW | 201125419 | 7/2011 |
| TW | 201144217 | 12/2011 |
| TW | 201250720 | 12/2012 |
| TW | I410615 | 10/2013 |
| TW | I486090 | 5/2015 |
| TW | 201625937 | 7/2016 |
| WO | 2016/107883 | 7/2016 |

OTHER PUBLICATIONS

Zhao Jun Han et al., Large-Diameter Single-Walled Carbon Nanotubes, J. Am. Chem. Soc., Mar. 12, 2012, 6018-6024, 134, 13.

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq=Investigation of Laser-Carbon Nanotubes Interaction and Development of CNT-Based Devices&as_occt=any).

Shimizu et al., Blackbody Thermal Radiator with Vertically Alighned Carbon Nanotube Coating, Japanese Journal of Applied Physics, May 15, 2014, 068004-1~068004-3.

Kohei Mizuno et al., A Black Body Absorber from Vertically Aligned Single-walled Carbon Nanotubes, PNAS, Apr. 14, 2009, 6044-6047, vol. 106, No. 15.

Kohei Mizuno et al. A black body absorber from vertically aligned single-walled carbon nanotubes, Proceedings of the Natinal Academy of Sciences, Apr. 14, 2009, vol. 106, 6044-6047.

* cited by examiner

CAVITY BLACKBODY RADIATION SOURCE AND METHOD OF MAKING THE SAME

CROSS-REFERENCE TO RELATED APPLICATIONS

This application claims all benefits accruing under 35 U.S.C. § 119 from China Patent Application No. 201810027421.1, filed on Jan. 11, 2018, in the China Intellectual Property Office, the contents of which are hereby incorporated by reference. The application is also related to copending applications entitled, "CAVITY BLACKBODY RADIATION SOURCE AND METHOD OF MAKING THE SAME", filed on Nov. 21, 2018** (application Ser. No. 16/198,549). The application is also related to copending applications entitled, "CAVITY BLACKBODY RADIATION SOURCE", filed on Nov. 21, 2018 (application Ser. No. 16/198,565). The application is also related to copending applications entitled, "PLANE SOURCE BLACKBODY", filed on Nov. 21, 2018 (application Ser. No. 16/198,577). The application is also related to copending applications entitled, "CAVITY BLACKBODY RADIATION SOURCE AND METHOD OF MAKING THE SAME", filed on Nov. 21, 2018 application Ser. No. 16/198,598). The application is also related to copending applications entitled, "PLANE SOURCE BLACKBODY", filed on Nov. 21, 2018 (application Ser. No. 16/198,606). The application is also related to copending applications entitled, "PLANE SOURCE BLACKBODY", filed on Jan. 10, 2019 (application Ser. No. 16/244,449). The application is also related to copending applications entitled, "BLACKBODY RADIATION SOURCE", filed on Jan. 10, 2019 (application Ser. No. 16/244,455). The application is also related to copending applications entitled, "BLACKBODY RADIATION SOURCE", filed on Jan. 10, 2019 (application Ser. No. 16/244,468). The application is also related to copending applications entitled, "BLACKBODY RADIATION SOURCE", filed on Jan. 10, 2019 (application Ser. No. 16/244,474). The application is also related to copending applications entitled, "BLACKBODY RADIATION SOURCE", filed on Jan. 10, 2019 (application Ser. No. 16/244,481). The application is also related to copending applications entitled, "PLANE SOURCE BLACKBODY", filed on Jan. 10, 2019** (application Ser. No. 16/244,488).

FIELD

The present disclosure relates to a cavity blackbody radiation source and a method for making the same.

BACKGROUND

With a rapid development of infrared remote sensing technology, the infrared remote sensing technology is widely used in military and civilian fields, such as earth exploration, weather forecasting, and environmental monitoring. However, all infrared detectors need to be calibrated by a blackbody before they can be used. The higher an emissivity of the blackbody, the higher an accuracy of a calibration of the infrared detector. An effective emissivity of a cavity blackbody mainly depends on an opening size of the cavity blackbody, a shape of the cavity blackbody, an emissivity of a material inside the cavity blackbody, and an isothermal degree in the cavity blackbody. Therefore, selecting high emissivity intracavity surface materials has a great significance for obtaining high performance blackbody radiation sources.

BRIEF DESCRIPTION OF THE DRAWINGS

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 1:
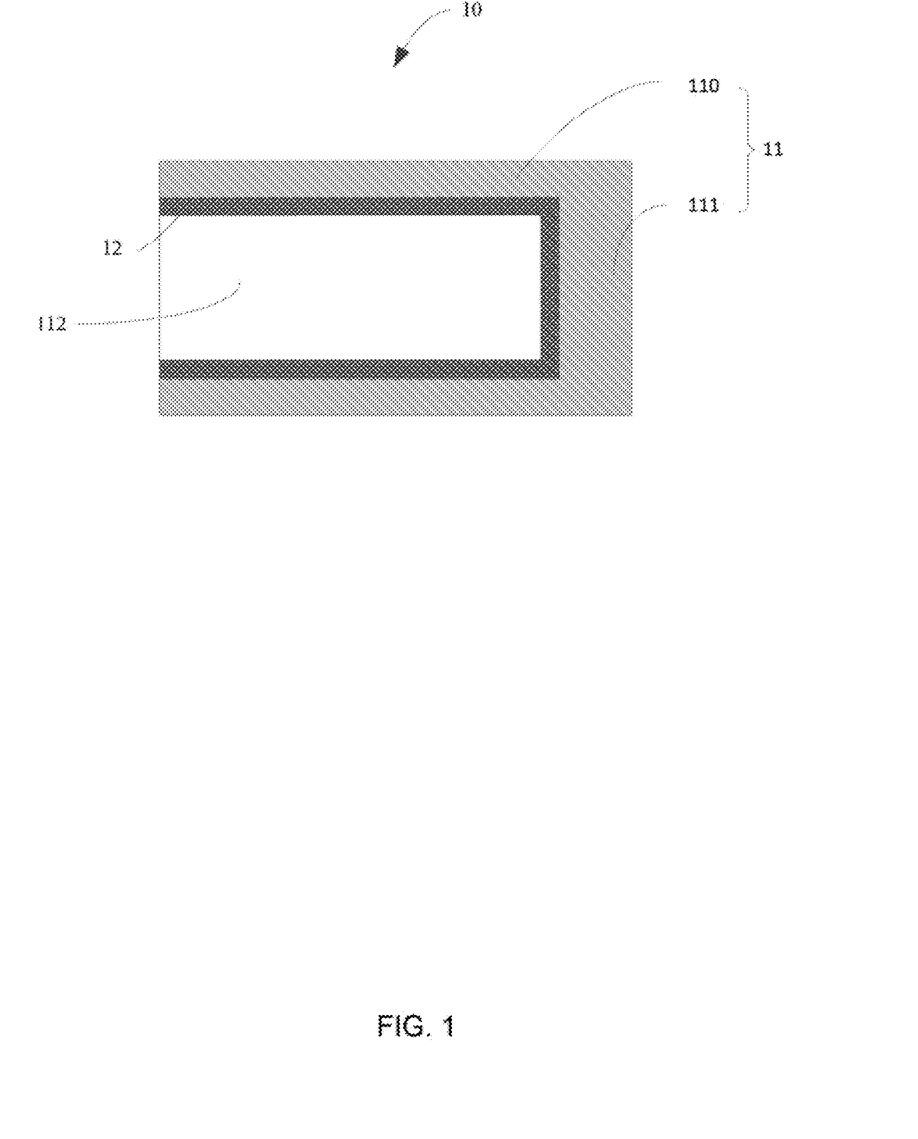
FIG. 1 is a section structure diagram of one embodiment of a cavity blackbody radiation source.

FIG. 1 shows a cavity blackbody radiation source 10 of one embodiment. The cavity black body radiation source 10 comprises a blackbody radiation cavity 11 and a carbon nanotube layer 12. The blackbody radiation cavity 11 comprises an inner surface. The carbon nanotube layer 12 is located on the inner surface. The carbon nanotube layer 12 comprises at least one carbon nanotube film.

The blackbody radiation cavity 11 is made of a material resistant to temperature and having a high emissivity. The blackbody radiation cavity 11 can be made of hard aluminum material, aluminum alloy material or oxygen-free copper. The blackbody radiation cavity 11 comprises a blackbody cavity 110 and a blackbody cavity bottom 111. The blackbody cavity 110 and the blackbody cavity bottom 111 can be an integrally structure. The blackbody cavity 110 and the blackbody cavity bottom 111 can also be two independent structures, and the blackbody cavity bottom 111 can be pressed into or can be screwed into the blackbody cavity 110 from an end opening of the blackbody cavity 110.

The blackbody cavity 110 comprises a room 112. A cross section of the room 112 can be circle, ellipse, triangle, quad, or other polygon. A shape of a bottom surface of the room 112 is not limited. The shape of the bottom surface of the room 112 can be a flat surface, a tapered surface, a prismatic surface, or other surfaces.

The cavity blackbody radiation source 10 can further comprises a heating element. In one embodiment, the heating element comprises a carbon nanotube structure, a first electrode and a second electrode, the first electrode and the second electrode are spaced apart from each other on a surface of the carbon nanotube structure. The carbon nanotube structure is wrapped or wound around an outer surface of the blackbody radiation cavity 11. The carbon nanotube structure comprises at least one carbon nanotube film or at least one carbon nanotube wire. The carbon nanotube structure comprises a plurality of carbon nanotubes connected end to end and arranged in a preferred orientation. The plurality of carbon nanotubes of the carbon nanotube structure extends from the first electrode to the second electrode.

Because the carbon nanotube structure is wrapped or wound around the outer surface of the blackbody radiation cavity 11, after the carbon nanotube structure is energized by the first electrode and the second electrode, the carbon nanotube structure can heat the whole blackbody radiation cavity 11. So that a temperature field inside the blackbody radiation cavity 11 is evenly distributed, the temperature stability and uniformity of the cavity blackbody radiation source 10 can be improved. Since carbon nanotube has small density and light weight, using the carbon nanotube structure as the heating element allows the cavity blackbody radiation source 10 to have a lighter weight. Since carbon nanotubes have high electrothermal conversion efficiency and low thermal resistance, and the carbon nanotube structure has small resistance; using the carbon nanotube structure to heat the blackbody radiation cavity has the characteristics of rapid temperature rise, small thermal hysteresis and fast heat exchange rate. Carbon nanotubes have good toughness, and thus the cavity blackbody radiation sources using the carbon nanotube structure as heating element have a long service life.

The at least one carbon nanotube film of the carbon nanotube layer 12 can be a drawn carbon nanotube film, a flocculated carbon nanotube film or a pressed carbon nanotube film. When the carbon nanotube layer 12 comprises only one carbon nanotube film, the carbon nanotube layer 12 comprises one drawn carbon nanotube film, one flocculated carbon nanotube film, or one pressed carbon nanotube film. When the carbon nanotube layer 12 comprises at least two carbon nanotube films, the carbon nanotube layer 12 comprises at least two films of the drawn carbon nanotube film, the flocculated carbon nanotube film, and the pressed carbon nanotube film stacked with each other.

The drawn carbon nanotube film is directly drawn from a super-aligned carbon nanotube array. Examples of a method of drawing the drawn carbon nanotube film is taught by US patent application US 20080248235 A1 to Feng et al.

Figure 2:
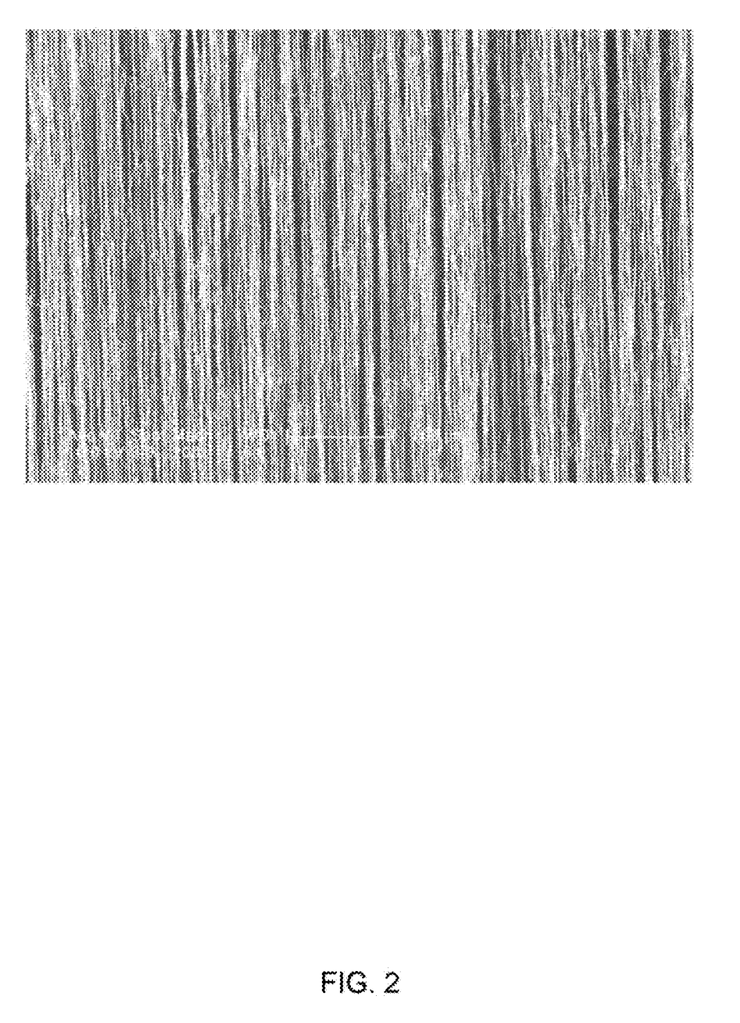
FIG. 2 is a scanning electron microscope (SEM) image of a drawn carbon nanotube film.

FIG. 2 illustrates the drawn carbon nanotube film includes a number of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. A minority of carbon nanotubes in the drawn carbon nanotube film may be randomly aligned. However, the number of randomly aligned carbon nanotubes is very small and does not affect the overall oriented alignment of the majority of carbon nanotubes in the drawn carbon nanotube film.

The majority of the carbon nanotubes in the drawn carbon nanotube film substantially aligned along the same direction may not be exactly straight, and can be curved to a certain degree, or are not exactly aligned along the overall aligned direction, and can deviate from the overall aligned direction by a certain degree. Therefore, partial contacts can exist between the randomly aligned carbon nanotubes and adjacent carbon nanotubes.

The drawn carbon nanotube film includes a plurality of successively oriented carbon nanotube segments joined end-to-end by van der Waals force. Each carbon nanotube segment includes a plurality of carbon nanotubes substantially parallel to each other, combined together by van der Waals force. A plurality of micropores can be formed among the plurality of carbon nanotubes.

When the carbon nanotube layer 12 comprises at least two carbon nanotube films, an angle is formed between the carbon nanotubes of adjacent wo carbon nanotube drawn films. The angle ranges from 0° to 90°. The number of the drawn carbon nanotube films of the carbon nanotube layer 12 is not limited. In one embodiment, the carbon nanotube layer 12 comprises ten drawn carbon nanotube films stacked with each other, and the carbon nanotubes of adjacent drawn carbon nanotube films are vertical crossed to form a plurality of micropores.

Figure 3:
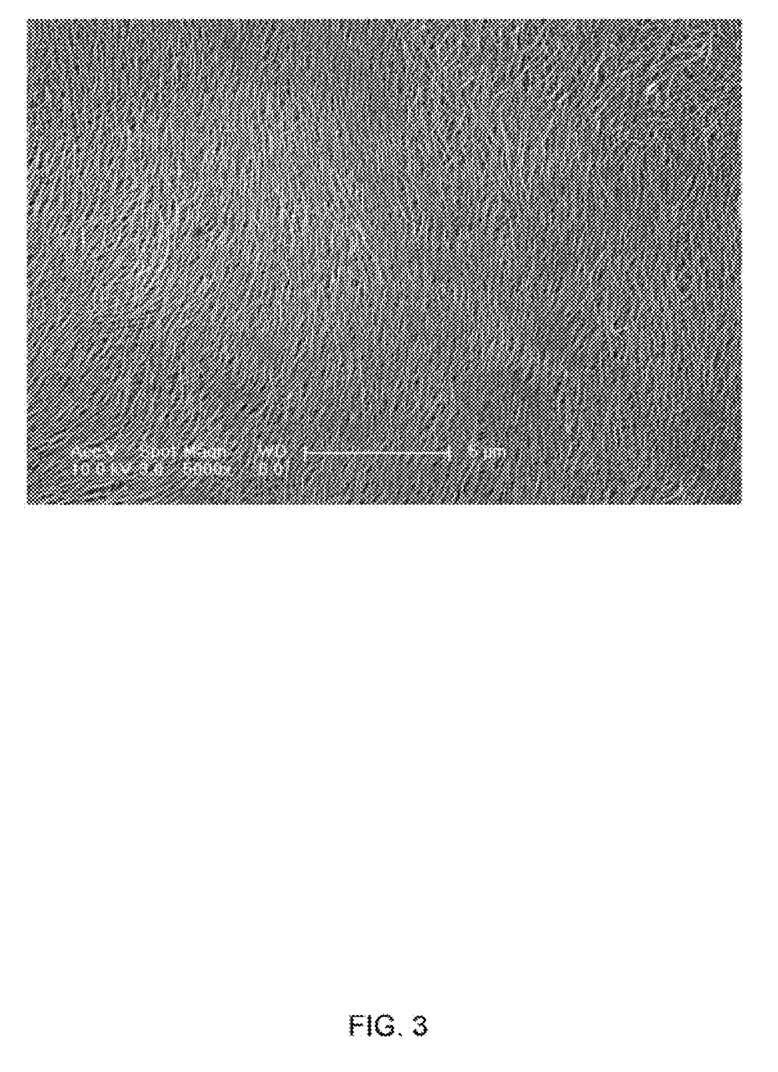
FIG. 3 is an SEM image of a pressed carbon nanotube film comprising a plurality of carbon nanotubes arranges along a same direction.
Figure 4:
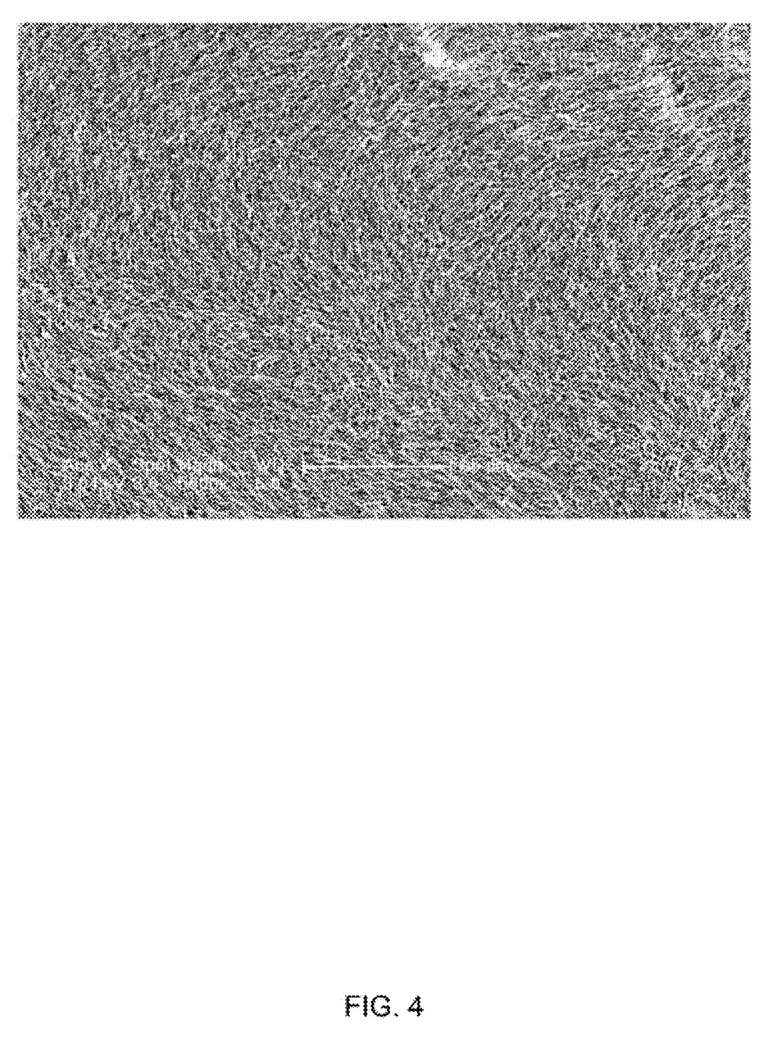
FIG. 4 is an SEM image of a pressed carbon nanotube film comprising a plurality of carbon nanotubes arranges along different directions.

FIG. 3 and FIG. 4 illustrate a pressed carbon nanotube film which can include a number of carbon nanotubes isotropically arranged along a same or different directions. Adjacent carbon nanotubes are attracted to each other and combined by van der Waals force. A planar pressure head can be used to press the carbon nanotubes array along a direction perpendicular to a substrate, thereby a pressed carbon nanotube film having a plurality of isotropically arranged carbon nanotubes can be obtained. A roller-shaped pressure head can be used to press the carbon nanotubes array along a fixed direction, thereby a pressed carbon nanotube film having a plurality of carbon nanotubes aligned along a fixed direction is obtained. The roller-shaped pressure head can also be used to press the array of carbon nanotubes along different directions, thereby a pressed carbon nanotube film having a plurality of carbon nanotubes aligned along different directions is obtained. Examples of pressed carbon nanotube films are taught by US PG Pub. 20080299031A1 to Liu et al.

An area and a thickness of pressed carbon nanotube film can be selected according to actual needs. The area of the pressed carbon nanotube film is substantially the same as a size of the carbon nanotube array. The thickness of the pressed carbon nanotube film is related to a height of the carbon nanotube array and a pressure of the rolling. The thickness of the pressed carbon nanotube film can range from about 1 micrometer to about 1 millimeter. The higher the height of the carbon nanotube array and the lower the pressure of the rolling, the larger the thickness of the pressed carbon nanotube film, on the contrary is also true. Gaps are formed between adjacent carbon nanotubes of the pressed carbon nanotube film, thus the pressed carbon nanotube film comprises a plurality of micropores. An aperture of each of the micropores is less than 10 microns.

Figure 5:
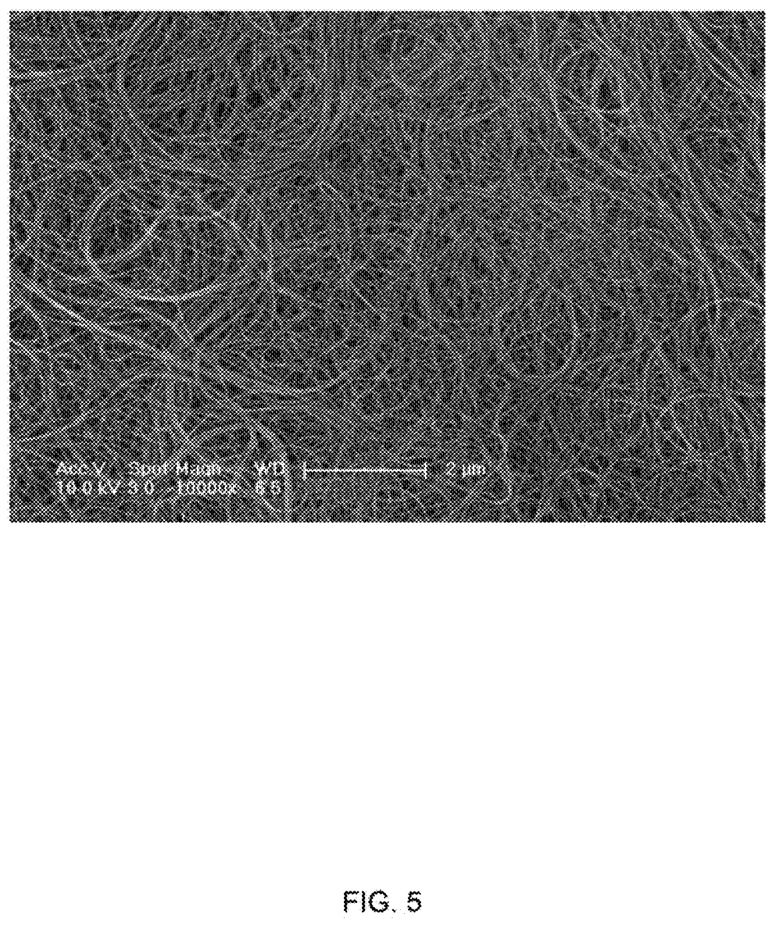
FIG. 5 is an SEM image of a flocculated carbon nanotube film.

FIG. 5 illustrates the flocculated carbon nanotube film includes a plurality of carbon nanotubes entangled with each other to form a network structure. A length of each of the plurality of carbon nanotubes is larger than 10 micrometers. In one embodiment, the length of each of the plurality of carbon nanotubes is larger than or equal to 200 micrometers and less than or equal to 900 micrometers. The carbon nanotubes can be substantially uniformly distributed in the flocculated carbon nanotube film. The flocculated carbon nanotube film comprises a plurality of micropores. An aperture of each of the micropores is less than 10 microns. The plurality of carbon nanotubes of the flocculated carbon nanotube film are entangled with each other, therefore, the flocculated carbon nanotube film has good flexibility and is a free-standing film. The free-standing film can be bent into any shape without breaking. An area and a thickness of the flocculated carbon nanotube film can be selected according to actual needs. The thickness of the flocculated carbon nanotube film can range from about 1 micrometer to about 1 millimeter. In one embodiment, the thickness of the flocculated carbon nanotube film can range from about 1 micrometer. The flocculated carbon nanotube film can be formed by flocculating the carbon nanotube array. Examples of the flocculated carbon nanotube film are taught by U.S. Pat. No. 8,808,589 to Wang et al.

Since the carbon nanotube layer 12 has a viscosity, the carbon nanotube layer can be adhered to the inner surface of the blackbody radiation cavity 11 without using an adhesive. Of course, in order to ensure that the carbon nanotube layer is closely combined with the inner surface of the black body radiation cavity 11, the adhesive can be coated on the inner surface to make the carbon nanotube layer attached to the inner surface firmly.

The cavity blackbody radiation source in this disclosure has many advantages. First, carbon nanotubes are currently the darkest material in the world, the emissivity of carbon nanotubes is 99.6%, which is far larger than that of currently surface material of the inner wall of the black body cavity. For example, an emissivity of the Nextel Velvet 81-21 black lacquer is only 96%. Therefore, the emissivity of carbon nanotube composites comprising the carbon nanotubes and black lacquer is also larger than that of the surface material of currently inner wall of the blackbody cavity.

Second, currently, the cavity blackbody radiation source obtains a larger emissivity by using large emissivity coating material, increasing a depth of the blackbody radiation cavity and reducing the caliber. However, the cavity blackbody radiation source of this disclosure adopts the carbon nanotube composite material as the inner surface material of the blackbody radiation cavity, the depth of the blackbody radiation cavity is greatly reduced under the same effective emissivity of the cavity, and therefore, a miniaturization of the cavity blackbody radiation source can be realized.

Third, the carbon nanotubes can be prepared by a chemical vapor deposition of carbon source gas under high temperature conditions, and the raw materials are cheap and easy to obtain.

Fourth, the carbon nanotubes have excellent thermal conductivity, using the carbon nanotube layer as the inner surface material of the black body radiation cavity can improve the temperature uniformity and stability of the black body radiation source.

Fifth, the carbon nanotubes have excellent mechanical properties. The use of carbon nanotube materials to prepare cavity blackbody radiation sources can increase the stability of the cavity blackbody radiation source, and make the star borne blackbody not easy to damage in harsh environments.

Figure 6:
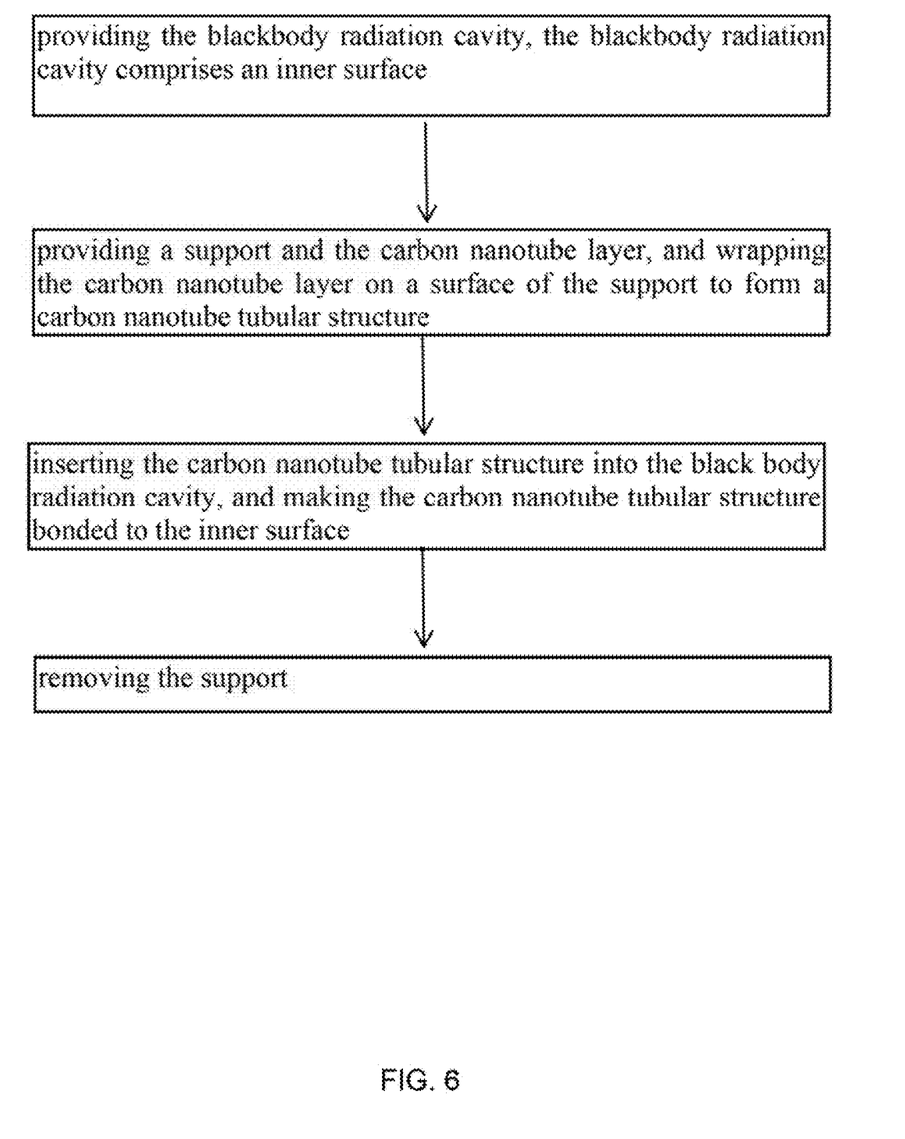
FIG. 6 is a flow diagram of a method of making the cavity blackbody radiation source in FIG. 1.

FIG. 6 shows a method of making the cavity blackbody radiation source 10, in one embodiment. The method comprises:

block (B11), providing the blackbody radiation cavity 11, the blackbody radiation cavity 11 comprises an inner surface;

block (B12), providing a support and the carbon nanotube layer 12, and wrapping the carbon nanotube layer 12 on a surface of the support to form a carbon nanotube tubular structure;

block (B13), inserting the carbon nanotube tubular structure into the black body radiation cavity 11, and attaching the carbon nanotube tubular structure on the inner surface; and block (B14), removing the support.

In block (B11), the blackbody radiation cavity 11 is an integral cylindrical structure. A material of the blackbody radiation cavity 11 is an aluminum alloy. The blackbody radiation cavity 11 comprises a room 112. The cavity 113 is cylindrical. A bottom surface of the room 112 is a flat surface.

In one embodiment, block (B12) comprises: providing a film and fixing the carbon nanotube layer on a surface of the film; and rolling the film into a cylindrical structure, in which a side of the carbon nanotube layer faces outward to form the carbon nanotube tubular structure. The film has excellent flexibility, and the film can be a poly (ethylene terephthalate) (PET) film, a polydimethylsiloxane (PDMS) film or the like. A size of the carbon nanotube tubular structure can be adjusted according to a size of the black body radiation cavity 11. In one embodiment, the film is the PET film. The carbon nanotube layer 12 comprises ten drawn carbon nanotube films stacked with each other, and the carbon nanotubes in adjacent drawn carbon nanotube films are vertically crossed to form a plurality of micropores.

In one embodiment, block (B12) comprises: providing a cylindrical support and wrapping the carbon nanotube layer on an outer surface of the support to form the carbon nanotube tubular structure. A material of the support is a polymer material. A diameter of the support is slightly smaller than a diameter of the room 112.

In block (B11), in order to ensure that the carbon nanotube layer is closely combined with the inner surface of the black body radiation cavity 11, an adhesive can be coated on the inner surface to make the carbon nanotube layer attached to the inner surface firmly.

In one embodiment, the method further comprises wrapping the heating element on the outer surface of the blackbody radiation cavity 11, and the blackbody radiation cavity 11 can be heated in real time.

Figure 7:
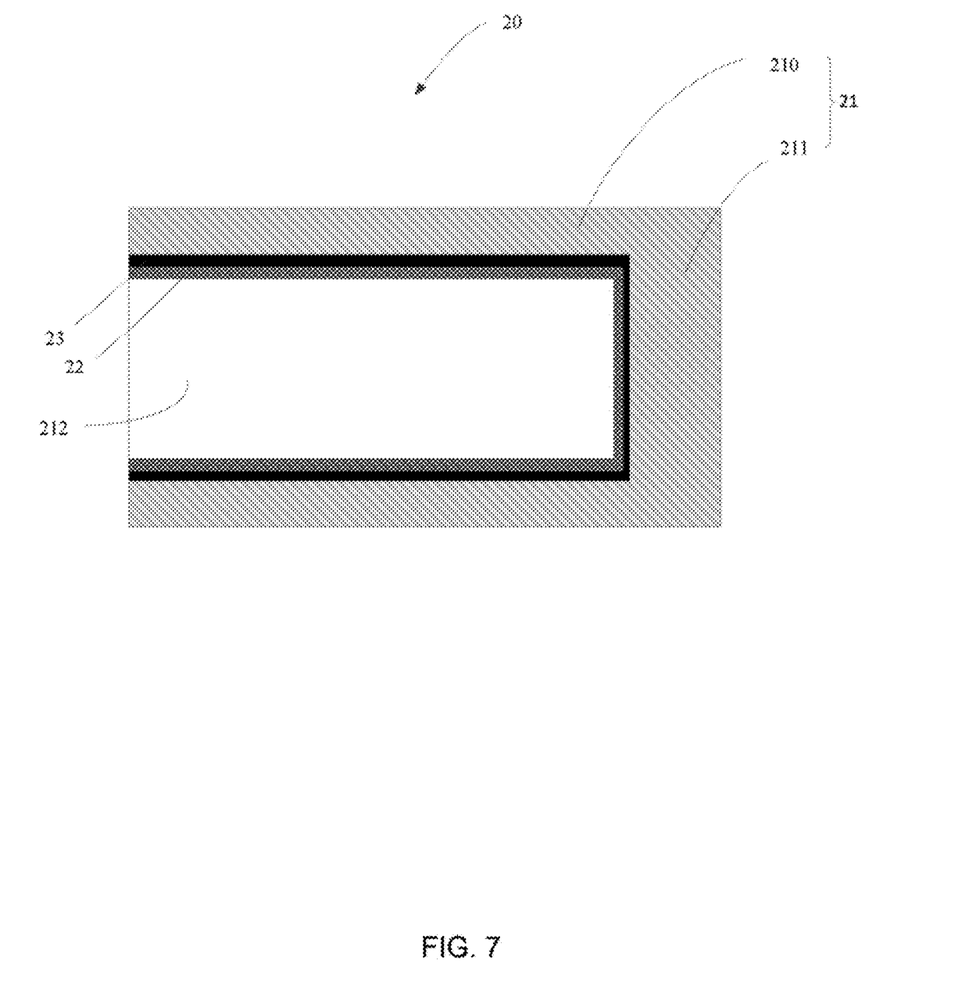
FIG. 7 is a section structure diagram of one embodiment of a cavity blackbody radiation source.

FIG. 7 shows a cavity blackbody radiation source 20 of one embodiment. A structure of the cavity black body radiation source 20 is substantially the same as that of the cavity black body radiation source 10. The cavity black body radiation source 20 comprises a blackbody radiation cavity 21, a carbon nanotube layer 22, and a black lacquer 23. The blackbody radiation cavity 21 comprises an inner surface. The black lacquer 23 is located on the inner surface. The carbon nanotube layer 22 is located on a surface of the black lacquer 23 away from the blackbody radiation cavity 21. The carbon nanotube layer 22 is the same as the carbon nanotube layer 12.

The blackbody radiation cavity 21 comprises a blackbody cavity 210 and a blackbody cavity bottom 211. The blackbody cavity 210 and the blackbody cavity bottom 211 can be an integrally structure. The blackbody cavity 210 has a room 212. The room 212 has a circular cross section.

The black lacquer 23 has high emissivity, such as Pyromark 1200 black lacquer having an emissivity 0.92, Nextel Velvet 811-21 black lacquer having an emissivity 0.95. In one embodiment, the black lacquer 23 is the Nextel Velvet 811-21 black lacquer. A thickness of the black lacquer 23 can not be too small or too large. When the thickness of the black lacquer 23 is too small, a binding force between the carbon nanotube layer 22 and the inner surface of the blackbody radiation cavity 21 is weak, and the carbon nanotube layer 22 cannot be firmly fixed to the inner surface of the black body radiation cavity 21. On the contrary, when the thickness of the black lacquer 23 is too large, the carbon nanotube layer 22 is embedded in the black lacquer 23, therefore, a structure of the carbon nanotube layer 22 is destroyed, and a high emissivity of the carbon nanotube layer 22 cannot be exhibited.

Figure 8:
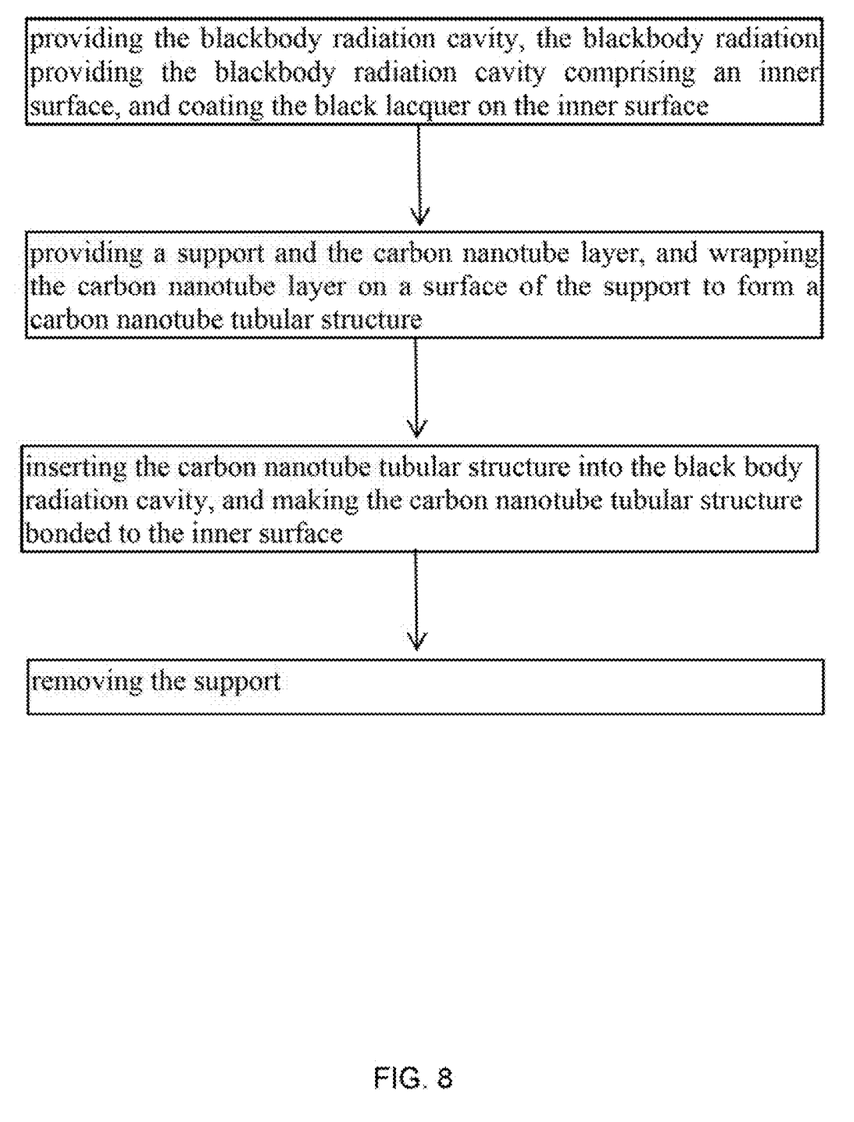
FIG. 8 is a flow diagram of a method of making the cavity blackbody radiation source in FIG. 7.

FIG. 8 shows a method of making the cavity blackbody radiation source 20, in one embodiment. The method comprises:

block (B21), providing the blackbody radiation cavity 21 comprising an inner surface, and coating the black lacquer 23 on the inner surface;

block (B22), providing a support and the carbon nanotube layer 22, and wrapping the carbon nanotube layer 22 on a surface of the support to form a carbon nanotube tubular structure;

block (B23), inserting the carbon nanotube tubular structure into the black body radiation cavity 21, and attaching the carbon nanotube tubular structure on the inner surface; and block (B24), removing the support.

The method of making the cavity blackbody radiation source 20 is the same as the method of making the cavity blackbody radiation source 10 except block (B21). The black lacquer 23 has high emissivity, such as Pyromark 1200 black lacquer having an emissivity 0.92, Nextel Velvet 811-21 black lacquer having an emissivity 0.95. In one embodiment, the black lacquer 23 is the Nextel Velvet 811-21 black lacquer.

The black lacquer 23 is located between the inner surface and the carbon nanotube layer 22, therefore, the carbon nanotube layer 22 can be more firmly bonded to the inner surface of the black body radiation cavity 21. Furthermore, the black lacquer is a high emissivity material, so that the emissivity of the cavity blackbody radiation source 20 can be further improved.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A cavity blackbody radiation source comprising:
a blackbody radiation cavity comprising an inner surface; and
a carbon nanotube layer covering on an entire inner surface of the blackbody radiation cavity, wherein the carbon nanotube layer comprises at least one carbon nanotube film and a plurality of micropores, the least one carbon nanotube film consists of a plurality of carbon nanotubes parallel with the inner surface.

2. The cavity blackbody radiation source of claim 1, wherein the at least one carbon nanotube film is a drawn carbon nanotube film, a flocculated carbon nanotube film or a pressed carbon nanotube film.

3. The cavity blackbody radiation source of claim 2, wherein the carbon nanotube layer comprises at least two carbon nanotube films stacked with each other, and the at least two carbon nanotube films comprises at least two films of the drawn carbon nanotube film, the flocculated carbon nanotube film, and the pressed carbon nanotube film.

4. The cavity blackbody radiation source of claim 2, wherein the drawn carbon nanotube film comprises a plurality of carbon nanotubes, and the plurality of carbon nanotubes are arranged substantially along a same direction.

5. The cavity blackbody radiation source of claim 2, wherein the pressed carbon nanotube film comprises a plurality of carbon nanotubes, and the plurality of carbon nanotubes are isotropically arranged along a same or different directions.

6. The cavity blackbody radiation source of claim 2, wherein the flocculated carbon nanotube film comprises a plurality of carbon nanotubes, and a network structure is formed by the plurality of carbon nanotubes entangled with each other by Van der Waals forces.

7. The cavity blackbody radiation source of claim 1, wherein the carbon nanotube layer is adhered to the inner surface without using an adhesive.

8. The cavity blackbody radiation source of claim 1, wherein a material of the blackbody radiation cavity is hard aluminum material, aluminum alloy material or oxygen-free copper.

9. The cavity blackbody radiation source of claim 1, wherein the blackbody radiation cavity comprises an outer surface, and the cavity blackbody radiation source comprises a heating element wrapped or wound around the outer surface of the blackbody radiation cavity.

10. The cavity blackbody radiation source of claim 9, wherein the heating element comprises a carbon nanotube structure, a first electrode and a second electrode, the first electrode and the second electrode are located on a surface of the carbon nanotube structure and spaced apart from each other.

11. A method of making a cavity blackbody radiation source comprises:
step (S11), providing a blackbody radiation cavity comprising an inner surface, a support and a carbon nanotube layer;

step (S12), wrapping the carbon nanotube layer on a surface of the support to form a carbon nanotube tubular structure comprising:
   providing the film and fixing the carbon nanotube layer on a surface of the film; and
   rolling the film into a cylindrical structure, and a side of the carbon nanotube layer faces outward to form the carbon nanotube tubular structure;
step (S13), inserting the carbon nanotube tubular structure into the black body radiation cavity, and attaching the carbon nanotube tubular structure on the inner surface; and
step (S14), removing the support.

12. The method of claim 11, wherein a material of the support is a flexible material.

13. The method of claim 11, wherein the support comprises an outer surface, and step (S12) comprises: providing a cylindrical support and wrapping the carbon nanotube layer on the outer surface of the support to form the carbon nanotube tubular structure.

14. The method of claim 11, wherein in step (S13), before inserting the carbon nanotube tubular structure into the black body radiation cavity, further comprises coating an adhesive on the inner surface.

15. The method of claim 11, wherein the blackbody radiation cavity comprises an outer surface, and after step (S14), further comprises wrapping a heating element on the outer surface of the blackbody radiation cavity.

16. The method of claim 15, wherein the heating element comprises a carbon nanotube structure, a first electrode and a second electrode, the first electrode and the second electrode are located on a surface of the carbon nanotube structure spaced apart from each other.

* * * * *